H. J. REEVES.
SPRINKLER NOZZLE.
APPLICATION FILED MAR. 18, 1915.
1,271,939.
Patented July 9, 1918.
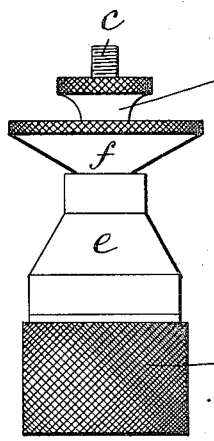
Fig. 1
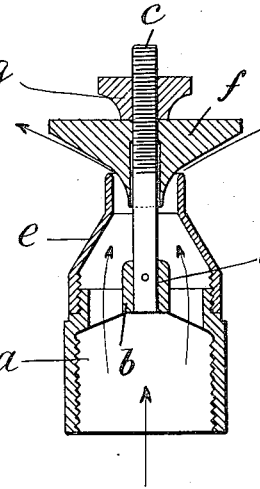
Fig. 2
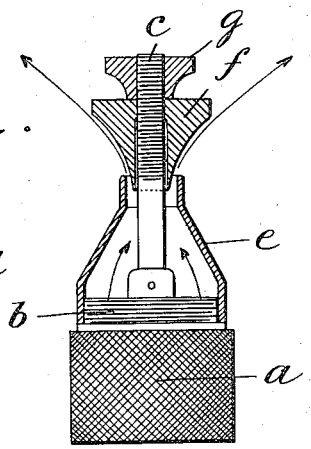
Fig. 3
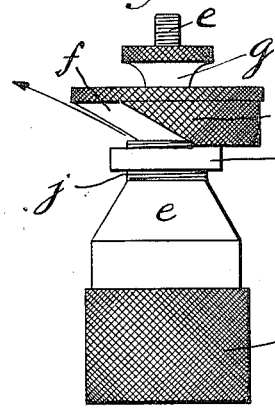
Fig. 4
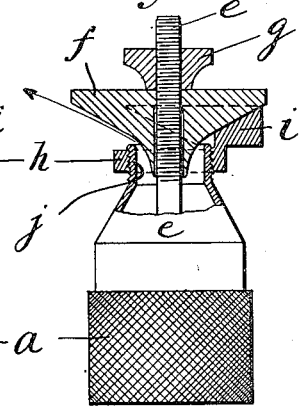
Fig. 5
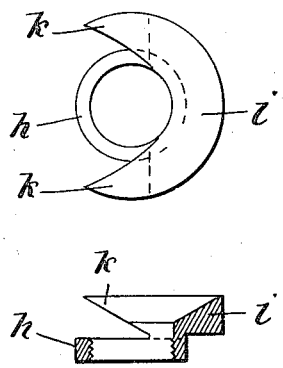
Fig. 6
Fig. 7
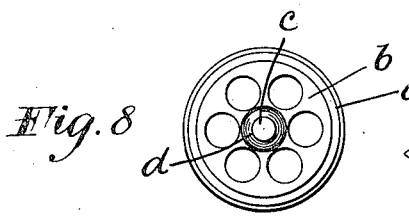
Fig. 8
Herbert J. Reeves, Inventor
By his Attorneys

UNITED STATES PATENT OFFICE.

HERBERT J. REEVES, OF NEW YORK, N. Y.

SPRINKLER-NOZZLE.

1,271,939.  Specification of Letters Patent.  Patented July 9, 1918.

Application filed March 18, 1915. Serial No. 15,184

*To all whom it may concern:*

Be it known that I, HERBERT J. REEVES, a citizen of the United States of America, and resident of the borough of Manhattan, city, county, and State of New York, have invented certain new and useful Improvements in Sprinkler-Nozzles, of which the following is a specification.

My invention relates to sprinkler nozzles of that type particularly adapted for spraying and irrigation purposes and the object of the invention is to produce such a device wherein the spray will be evenly distributed in the form of either a fine mist or heavy shower or in any intermediate condition, without employing any revolving parts.

In the following I have described, in connection with the accompanying drawings, several forms of device illustrating my invention and modifications thereof.

In the drawings Figure 1 is an elevation showing one form of device; Fig. 2 is a vertical sectional view of the form of device shown in Fig. 1; Fig. 3 is an elevation, partly in section, illustrating a means of varying the spread of the water or other fluid; Fig. 4 is an elevation of a form showing in connection therewith a device for limiting the throw of spray to a certain direction; Fig. 5 is a view of the device shown in Fig. 4, partly in vertical section; Fig. 6 is a plan view of the limiting device; Fig. 7 is a cross sectional view of the device shown in Fig. 6; and Fig. 8 is a plan view of a detail of construction.

Similar letters of reference indicate similar parts throughout the several views.

$a$ indicates the base of the nozzle internally screw-threaded for connection to a suitable pipe or hose. The exterior of base $a$ is shown as being roughened to provide for frictional engagement to adjust it on the pipe or hose. The top of base $a$ is provided with a perforated plate $b$, which may be either a separate piece or formed integrally with the base, the plate $b$ forming a support for screw-threaded stem $c$ which may be pinned in a socket $d$ carried by plate $b$ or otherwise mounted thereon. The perforations of plate $b$ form means whereby the fluid carried through the nozzle may be freely passed therethrough. $e$ indicates a tapering cap, open at the top and adapted to be engaged with base $a$ by screw-threaded or other suitable means. $f$ indicates a spreader in substantially the form of an inverted truncated cone having an outwardly concavely curved configuration, and adapted to screw-threaded engagement with stem $c$. $g$ is a lock-nut for holding spreader $f$ in adjusted position on stem $c$. In Fig. 3 the cap $e$ is shown as having a greater taper and a smaller opening than the corresponding cap $e$ in Fig. 2 and the spreader $f$ is also shown as having a greater taper than the corresponding spreader in Fig. 2.

In operation the fluid, under pressure, passes through the nozzle, strikes against the spreader and is deflected a greater or less distance according to the pressure, the shape or angle of taper of the spreader, the distance of the spreader from the top of the cap and the size of the opening in the top of the cap. The fluid is also directed more or less horizontally or vertically according to the shape or angle of taper of the spreader, the distance of the spreader from the top of the cap and the size of the opening in the cap. The size of the drops of fluid sprayed is adjusted by varying the distance of the spreader from the top of the cap. The rate of discharge of fluid per unit of time is also adjusted by varying the size of opening in the top of the cap and the distance of the spreader from the top of the cap.

The form of device shown in Fig. 2 will throw the fluid a greater distance than the form shown in Fig. 3 because of the angle of taper of the spreader while the form shown in Fig. 3 will throw the fluid higher and in a finer spray than that shown in Fig. 2. When the spray is to be thrown higher it is desirable to have it finer and therefore the cap with the smaller opening and the spreader with the greater angle of taper should then be used, the adjustment of spreader to opening also regulating the size of the drops from drops or even a sheet of fluid to a fine mist. It is thus obvious that by varying the distance of spreader from cap opening and by interchanging caps and spreaders, any desirable volume of flow per unit of time, distance and direction of throw and size of drops may be obtained.

It frequently happens that in irrigating, for example, it is desired not to throw the fluid in a certain direction because of the presence of walks, hedges, obstructions, areas not desired to be irrigated at the time and so forth. I have provided for this by means of the device shown in connection with Figs. 4 to 6 inclusive.

In the form of device shown in these figures, in addition to the parts heretofore described, I have provided a bushing $h$ carrying a shield or plug piece $i$. The bushing is shown as internally screw-threaded to coact with the externally screw-threaded neck $j$ of cap $e$ and as being located between the cap $e$ and spreader $f$. As illustrated the shield $i$ covers approximately one-third of the opening at the top of the cap and is provided with forwardly projecting, deflecting wings $k$, $k$, merging into the downward taper of spreader $f$. The top of the shield $i$ is cut away to receive and form a seat for the spreader. As shown the device will throw the liquid over an area of approximately 180°, the spreader being seated against the shield. The shield may be adjusted relative to the cap so that the spreader may also be adjusted relative to the cap as described in connection with Figs. 1 to 3. The spreader and shield may also be adjusted relative to each other, so that by leaving a space between them the fluid may be thrown the full distance, say 20 feet, on one side and any desired distance less than 20 feet, say 4 feet, on the other side. In other words, the provision of a shield such as I have described enables the operator to control the area and extent of throw of the liquid as between the two sides of the device as well as to accomplish all the other objects of the broader invention. It is obvious that the use of a shield not only prevents waste of water but removes a serious annoyance heretofore found in sprinkler or spray devices in that it has been impossible to cover a desired area without also covering the adjacent area which it was not desired to irrigate or spray.

While I have described my invention more particularly in connection with water-irrigating it is also adaptable for the spraying of any suitable liquids such as insecticides, fungicides, sterilizing solutions, light paints and oils, whitewash and so forth, and I do not restrict myself to any particular use of the device nor to any particular construction of the parts thereof, further than the scope of the appended claim demands.

The base is generally designed as of a standard size while the caps and spreaders may be of various shapes and interchangeable for the effecting of the particular purpose in hand. It is to be understood that the device may be used in any position, horizontally, at an angle or inverted as desired. The edges of the spreaders, shields and lock nuts are shown as roughened or milled to afford a frictional grip for ready adjustment or removal. The arrows in the several figures show the direction of the fluid assumed to be passing therethrough.

I claim:

A sprayer nozzle comprising a base, a cap mounted thereon, a spreader adjustable toward and away from the cap and having a downwardly tapering configuration, and a shield for closing a portion of the opening between the cap and the spreader, the shield being provided with forwardly projecting, deflecting wings adapted to merge into the downward taper of the spreader.

In testimony whereof I have signed this specification in the presence of two subscribing witnesses.

HERBERT J. REEVES.

Witnesses:
 SEABURY C. MASTICK,
 K. G. LEARD.